United States Patent [19] [11] 4,368,467

Unotoro et al. [45] Jan. 11, 1983

[54] DISPLAY DEVICE

[75] Inventors: Tomoyuki Unotoro, Tokyo; Kunihiro Tanikawa, Kakogawa; Keizo Kurahashi, Kobe; Hisashi Yamaguchi, Hyogo; Yuichiro Ito; Yoshihiro Miyamoto, both of Kobe, all of Japan

[73] Assignee: Fujitsu Limited, Kawasaki, Japan

[21] Appl. No.: 236,621

[22] Filed: Feb. 20, 1981

[30] Foreign Application Priority Data

Feb. 29, 1980 [JP] Japan ................................ 55-25844
Oct. 31, 1980 [JP] Japan ................................ 55-154003

[51] Int. Cl.³ ................................ G06F 3/14
[52] U.S. Cl. ................................ 340/799; 340/771; 340/800; 313/500
[58] Field of Search ............... 340/760, 762, 765, 766, 340/768, 771, 781, 782, 789, 790, 794, 798, 799, 800, 811; 313/500; 328/37

[56] References Cited

U.S. PATENT DOCUMENTS 3,493,933 2/1970 Brooks ................................ 328/37
3,614,769 10/1971 Coleman ................................ 340/800
3,787,834 1/1974 Elliott ................................ 340/800
3,856,989 12/1974 Weimer ................................ 340/800
3,885,196 5/1975 Fischer ................................ 340/800
3,913,090 10/1975 Fischer ................................ 340/800
3,976,906 8/1976 Shattuck ................................ 313/500
4,039,890 8/1977 Bailey et al. ................................ 340/719
4,107,662 8/1978 Endd et al. ................................ 340/799

OTHER PUBLICATIONS

Ludo et al., "Design and Fabrication of Large-Area Thin-Film Transistor Matrix Circuits for Flat-Display Panels", Jan. 1980, vol. Ed-27, No. 1, pp. 223 to 230.

*Primary Examiner*—Alvin H. Waring
*Attorney, Agent, or Firm*—Staas & Halsey

[57] ABSTRACT

A new type flat panel display device has the structure combining a plurality of solid state display modules corresponding to character blocks. Each module is assembled using, as the basic element, a semiconductor substrate integrating circuit elements for driving and circuits for addressing, and moreover, it is provided with a memory element for a selection signal in view of making possible access to each module.

33 Claims, 13 Drawing Figures

DISPLAY DEVICE

BACKGROUND OF THE INVENTION

1. Field of the Invention

The present invention relates to an improvement of a flat panel display device, particularly to the latest improvement for large scale integration of the display device combining onto an integrated circuit active elements for driving a corresponding a picture element, the picture element and the display medium.

2. Description of the Prior Arts

Recently, proposed is a display unit having a structure such that an integrated drive circuit is combined with the flat panel type matrix display device which utilizes electroluminescence (EL) or liquid crystal. The drive circuit comprises active elements corresponding to the picture elements integrated onto a silicon wafer, thus controlling partially and selectively the optical functions of display mediums layered on the upper side of said silicon wafer. In addition, from the point of view of forming a display unit which is as wide as possible, an attempt has been made to integrate active elements corresponding to said picture elements utilizing the SOS (Silicon On Sapphire) technique or the thin film transistor (TFT) technique in place of the silicon wafer. One of such solid state flat panel displays is explained, for example, in the U.S. Pat. No. 3,866,209 entitled "CHARGE-TRANSFER DISPLAY SYSTEM" by P. K. Weimer. In addition, flat panel display using the TFT technique is proposed, for example, in the paper by F. C. Luo et al. entitled "Design and Fabrication of Large-Area Thin-Film Transistor Matrix Circuits for Flat-Display Panels" introduced in the IEEE Transactions, Vol. ED-27, No. 1, January 1980, pp 223–230.

However, it is very difficult to realize a large size flat panel matrix display device combining active elements as explained above with the existing techniques. Namely, in the case of the structure which integrates active elements corresponding to picture elements using the silicon wafer, the size of the display screen is limited by to the size of the wafer, and moreover, it is considerably difficult from the point of view of yield to form active elements and light emitting areas of as many as 240×240 without any fault on the ordinary 3-inch wafer. Further, it is also difficult to form the active elements for driving and the light emitting areas in such a number corresponding to the required picture elements with satisfactory yield even when the SOS structure or the TFT structure is employed, and after all it is the largest object for the display device of this type to economically obtain a large size display screen.

SUMMARY OF THE INVENTION

It is an object of this invention to offer a new structure for a flat panel display which can be manufactured economically with a high yield, in view of solving the above-mentioned problems.

It is another object of this invention to offer a modular type solid state display device which easily allows realization of a large size display structure and simple maintenance.

It is a further object of this invention to offer a modular type large scale flat panel display device.

In short, in the present invention the basic display element is obtained first by forming the small size display modules including a plurality of picture elements and then a display screen of the required area is then obtained by combining one or more such display modules. The display modules should have such a scale so as to be able to easily manufacture the circuit function elements that must be integrated without defects and desirably should be a scale, for example, such as 16×16 picture elements or more which is required for dot matrix display of one character. In addition, according to the present invention, the display module is basically composed of integrated circuit IC chips each of which integrates the picture element electrodes which face the display medium. The picture elements are arranged in the form of a matrix. The active elements for selectively driving correspond individually to each picture element electrode. In addition, an address circuit receives serially based on a predetermined timing the information signals (data signals) corresponding to the patterns to be displayed and distributes these signals to the active elements. Moreover, consideration is taken into account so that the complication of connecting lead wires is avoided when a plurality of relevant display modules are combined and mounted.

The present invention is, moreover, characterized in that the memory element which stores a module selection signal for the display module of the relevant display block is provided for each display block. The display block comprises a unit of one or plural display modules which form a large scale display screen, and it is constructed to selectively drive the corresponding display modules with an output of the memory element. Particularly, in this case, the memory elements for plural display blocks are connected in series in order to sequentially transfer the module selection signals. The access to the display modules can be sequentially and adequately controlled in accordance with the display contents such as in sequential access and high speed skip access etc. only by controlling the module selection signal transfer mode between the memory elements.

A preferred embodiment of the present invention is explained in more detail by referring to the drawings.

DESCRIPTION OF THE PREFERRED EMBODIMENTS

Figure 1:
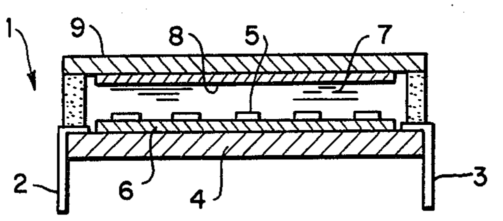
FIG. 1 is a sectional view of a model indicating an example of the structure of a display module which is the main component of the present invention.

FIG. 1 shows a model sectional view indicating the schematic structure of the display module which is used as the unit of basic structure of the display device of the present invention. The module 1 as a whole is structured as a stacked element comprising an insulating substrate 4 providing the connecting pins 2 and 3; a semiconductor IC chip integrating the required corresponding driving circuit elements which provide picture element electrodes 5 arranged in the form of a matrix as will be described later; a display medium 7 like the liquid crystal; and a cover 9 providing the transparent electrode 8 at the lower portion. Such stacking structure itself is substantially equivalent to the conventional display device of this type comprising active elements. However, the structure disclosed by the present invention is different from the conventional one in that the relevant stacking element itself is formed as a small scale display module comprising a unit of a character or several characters and simultaneously the address function it also comprised in it.

Figure 2:
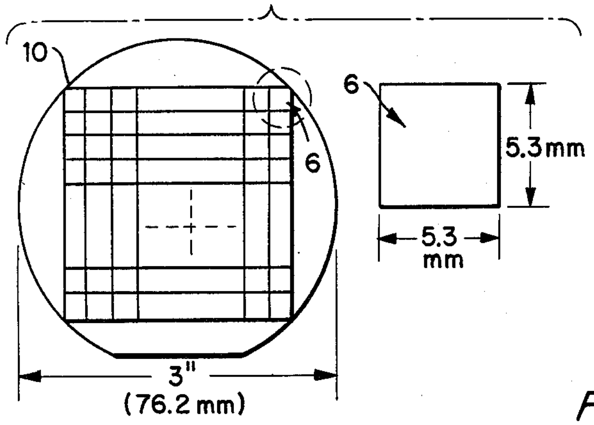
FIG. 2 is a plan view for explaining a method of forming an IC chip to be incorporated into the display module.

As an example, the IC chip 6 has a size as large as 5.3 mm square which is obtained by dividing longitudinally and laterally the silicon wafer 10 having a 3-inch diameter as shown in FIG. 2 into 1/10 respectively and the IC chip 6 provides the circuit function required for controlling the display of one character. The dot matrix type character font usually employs the $7\times9$ dot picture element for the alphanumerics and also the $16\times16$ dot picture element which is sufficient even for the Chinese characters. Therefore, it is enough to integrate the selective driving functions of $24\times24$ picture elements per chip for the display of characters even including the cursor display and the space between characters and such integration can be realized with comparative ease. In addition, according to such element structure, since only the good chips can be used in place of a sheet of wafer as a whole, if defective chips are found, the loss can be minimized.

Figure 3:
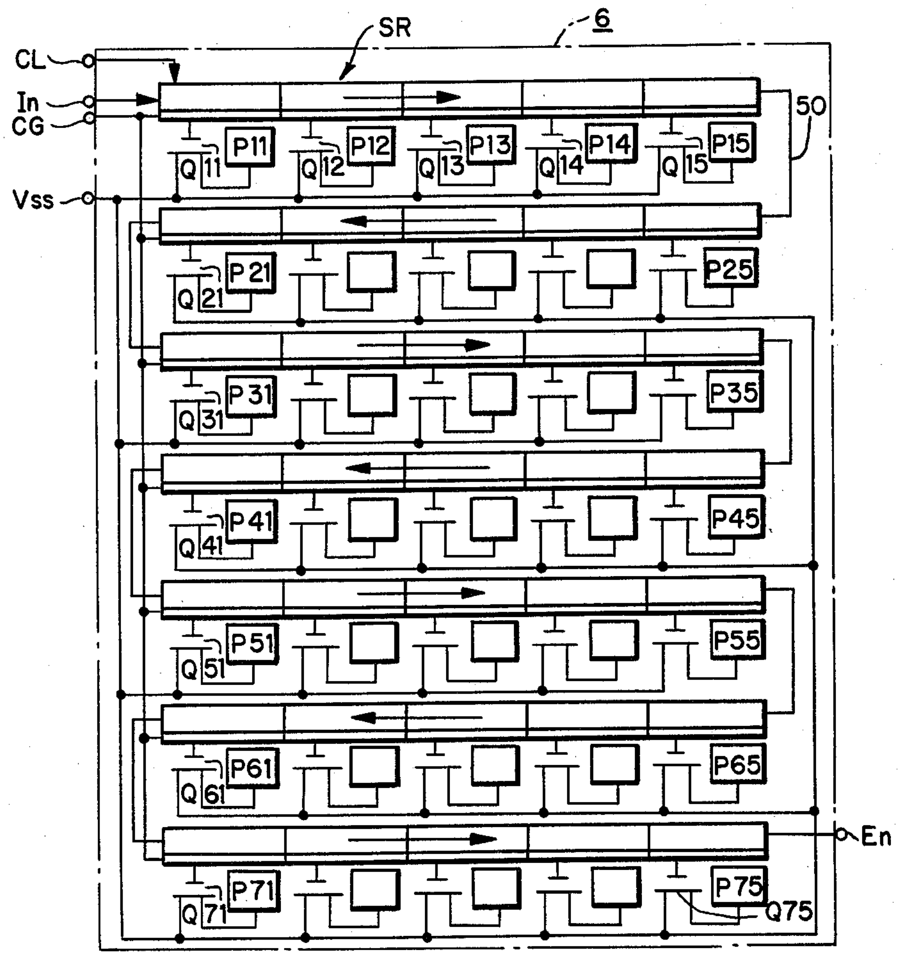
FIG. 3 is a schematic view indicating an example of the structure of a drive circuit to be integrated.

FIG. 3 is a circuit diagram of an example the structure of the driving circuit integrated onto said IC chip 6 for the $5\times7$ dot picture element structure. In FIG. 3, $P_{11}$, $P_{12}$,–, $P_{75}$ are picture element electrodes which are mutually insulated and formed on said silicon substrate having a small area corresponding to the arrangement of $5\times7$ matrix picture elements. These picture elements are respectively connected to the drain electrode of the field effect transistors (FET) $Q_{11}$, $Q_{12}$,–, $Q_{75}$ used as the active elements for selective driving. The source electrodes of these FETs are connected to the common source electrode terminal $V_{ss}$ and the gate electrodes are connected to the outputs of respective stages of the shift register SR for address via the common control gate electrode CG. In this case, the shift register SR as the address circuit has the structure of a series of static shift registers which are arranged in the meander formed between the lines of picture element electrodes, in addition the information signal (data) input terminal In and the clock signal input terminal CL are provided in the side of the first stage, while the end terminal En is provided in the side of the final stage.

The IC chip 6 comprising such circuit function can easily be produced by making use of the current semiconductor technology, particularly the MOS process technology. Thus, a display module 1 as shown in FIG. 1 can be completed by hermetically sealing the display medium, for example, the liquid crystal layer with the cover glass 9 under the condition that the portions other than the picture element electrodes, $P_{11}$,–$P_{75}$ is covered with an insulating film. In this case, the terminal guided from said IC chip 6 is enough when several terminals are provided including the input terminals for the information signal (data). Therefore, the connections with the lead pins 2 and 3 can be made easily on the occasion of mounting the chip on the supporting insulating substrate 4 for mounting.

Thus, the picture element of $5\times7$ dots using the liquid crystal as the display medium is defined on the area opposing the transparent electrode 8 inside the cover glass 9 and the picture element electrodes $P_{11}$ to $P_{75}$ on the IC chip 6. When the specified driving voltage is applied between the transparent electrode 8 and the common source electrode terminal $V_{ss}$ of the IC chip 6, when the information signal being sent to each stage of the shift register SR by applying the transfer signal to the control gate electrode CG is applied to the respective gate electrodes of the corresponding FETs $Q_{11}$ to $Q_{75}$ and after the information signal corresponding to the character pattern to be displayed is input in series from the input terminal In of the shift register SR, the selected FETs become ON and the corresponding picture element electrodes are driven, and as a result, the desired character pattern is displayed.

Explained above is an embodiment of the structure of the display module which is the basic element of the present invention, but a large scale flat panel display device can be formed easily by combining a plurality of such display modules.

Figure 4:
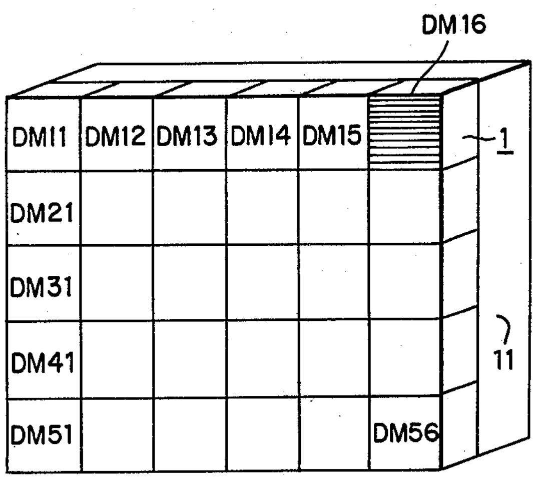
FIG. 4 is a model outline view indicating an example of the structure of a large scale display device.

FIG. 4 is a perspective view of a model of an embodiment of the structure of such a large scale display device, wherein the display area, 30 single display modules, can be obtained by mounting a total of 30 display modules $(5\times6)$ $DM_{11}$, $DM_{12}$,–, $DM_{56}$ on the common mounting substrate 11. Although not limited, individual the display module has, for example, such a structure as explained previously in regard to FIG. 1 and provides selectable matrix picture elements arrangement in a unit of one character or for one block. On the mounting substrate 11, the connecting holes or sockets not illustrated are provided for receiving the connecting pins 2 and 3 of respective display modules. Moreover, on the substrate, the wiring conductors for connecting and distributing the required signals and power sources are laid in the form of of matrix by means of the well known multilayer printed wiring technology, corresponding to the mounting locations of respective display modules $DM_{11}$ to $DM_{56}$. In addition, on the mounting substrate 11, the chip select circuit or decoder circuit not illustrated may be mounted in order to selectively drive respective display modules. As the connecting structure for mounting each display module on the substrate 11, a variety of connecting structures may be employed in addition to use of the connecting pins.

In the case of employing the above-mentioned module combination structure, when the address circuit accommodated on the IC chip of each module is the shift register having the one meander line 50 as indicated in FIG. 3, it very conveniently simplifies circuit mounting. Namely, the display data signal for the total display screen can be applied from the single input terminal and data distribution to individual display modules becomes very easy by connecting in series the output terminals of the shift register included in the adjacent display module. However, when the display screen further increases in size, requiring that a number of display modules be mounted, connections can also be made by dividing the input unit of display data into each line or block (plural modules). At any rate, since each display module comprises the address circuit of the time series input format, the connecting work for mounting the display modules in order to form a large scale display screen can be done easily.

Thus, according to the structure combining display modules as shown in FIG. 4, a display panel of the desired size can be obtained in accordance with the number of modules to be combined. Even when a display fault or function deterioration may be generated, the total quality can be maintained and economical maintenance work can be assured only by replacing the relevant defective display module.

Here, the said IC chip of each display module is not limited only to the integration of required circuit function elements on the above-mentioned silicon substrate but can be structured as the SOS structure utilizing the saphire substrate or the TFT structure using another insulating substrate. In addition, the address circuit which is integrated together with the active elements for driving corresponding picture elements is capable of employing a variety of structures in addition to that shown in FIG. 3.

Figure 5A:
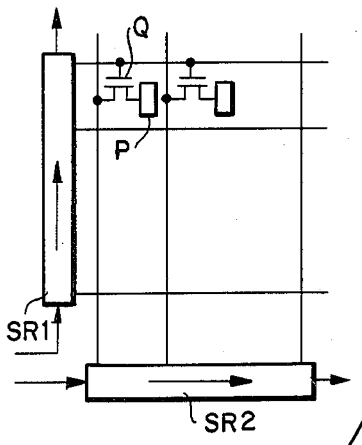
FIG. 5 comprising 5*a* and 5*b* shows another example of the address circuit to be integrated.
Figure 5B:
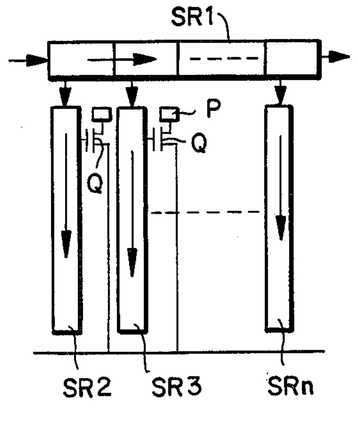

FIGS. 5 (*a*) and 5 (*b*) show block diagrams indicating modifications of such address circuits. In FIG. 5 (*a*), the gate electrodes of active elements Q arranged corresponding to the picture element electrodes are connected in the row (lateral) direction while the source electrodes are connected in the column (longitudinal) direction, and thereby the shift register SR 1, for data input in the row side, and the shift register SR 2, for scanning in the column direction, are provided. FIG. 5 (*b*) shows an example structure of the address circuit providing the shift register SR 1 for serial-to-parallel conversion and the branching registers SR 2 to SR n which are connected in parallel to each stage and extend in the longitudinal direction so that addressing is performed for each column of the active elements corresponding to the picture element electrodes.

A practical circuit structure of the shift register for addressing is not illustrated, but it can be formed as the well known single phase static shift register or 2-phase dynamic shift register. Moreover, it can be integrated as the shift register having the structure of charge transfer type CCD, BBD or PCD. In case such shift register as the address circuit occupies a large area on the IC chip so that thereby the size of the picture element electrode and the space for mounting are limited, it is recommended that the picture element electrode be placed on top of the insulating film, which is on top of the circuit function element surface, using the multi-layered wiring technique.

As the display medium which is hermetically sealed by stacking on the IC chip, the EL, ECD or LED may be used in addition to the liquid crystal indicated previously. Moreover, simple modification allows formation of the gas discharge type or the fluorescent display tube type display device.

In the case of forming the display module of the fluorescent display tube type, it is required that the fluorescent substance be coated on each picture element electrode to be used as the anode and that it be is sealed under the vacuum condition together with the common filament for the emission of electrons.

The display modules of the present invention, moreover, shows its excellent capability of configuring a large scale display device by combining a plurality of modules as explained previously. In such a case, for the mounting structure of display modules, all of the required modules can be mounted on the single mounting substrate 20 as shown in FIG. 4, but in addition to this, a sub-unit is formed by mounting previously the modules in the required numbers on the supporting substrate by a similar method. Moreover the display screen may be expanded gradually by mounting a plurality of such subunits on another substrate. In the case of using such interim unit structure, it is recommended to configure only the IC chips in units of characters or blocks and then assemble the structure of the display medium and cover glass provided thereon by stacking them in common for each sub-unit.

Figure 6:
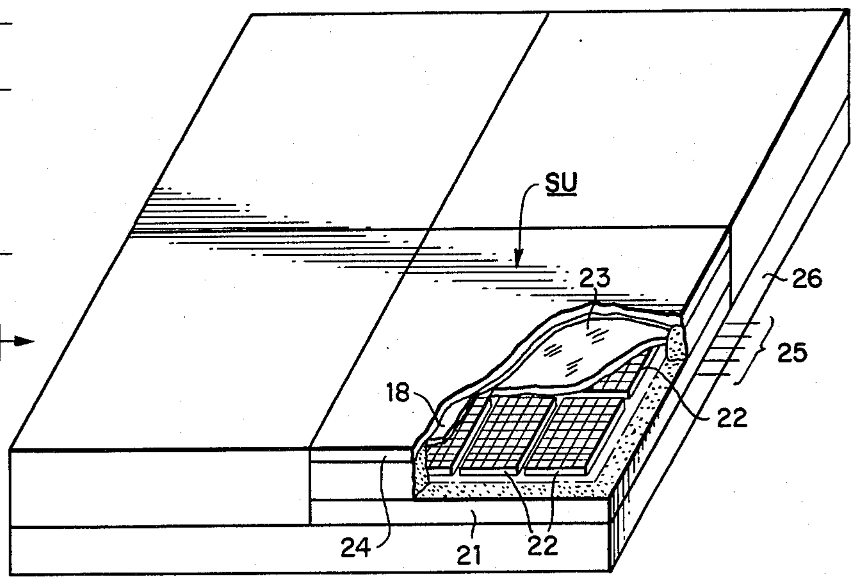
FIG. 6 is a partially cut-away perspective view indicating another example of the structure of a large scale display device.

FIG. 6 is a partially cut-away perspective view of a model indicating a display device employing the subunit structure. In this figure, on the subunit substrate 21, a plurality of IC chips 22, integrating picture element electrodes, active elements corresponding to them and the address circuits as explained above are bonded. Thereafter a sub-unit SU is structured by providing thereon the common display medium layer 23 and the cover glass 24 attached through hermetic sealing. The connecting leads for the IC chips are concentrated on the subunit substrate 21 and then lead out to the connecting pin 25, and these lead wires are connected to the bus (not illustrated) on the master substrate 26 together with a plurality of subunits. Of course, a display module or subunit can be formed in the desired size and shape and the desired display can be obtained by combining different shapes and sizes of them.

As explained above, the primary feature of the present invention is found in economically offering a large scale display device employing comparatively small scale display modules which can easily be produced without defects as the unit of configuration. As a result, an embodiment of circuit structure which has an advantage for the combination of plural display modules is explained hereunder.

Figure 7:
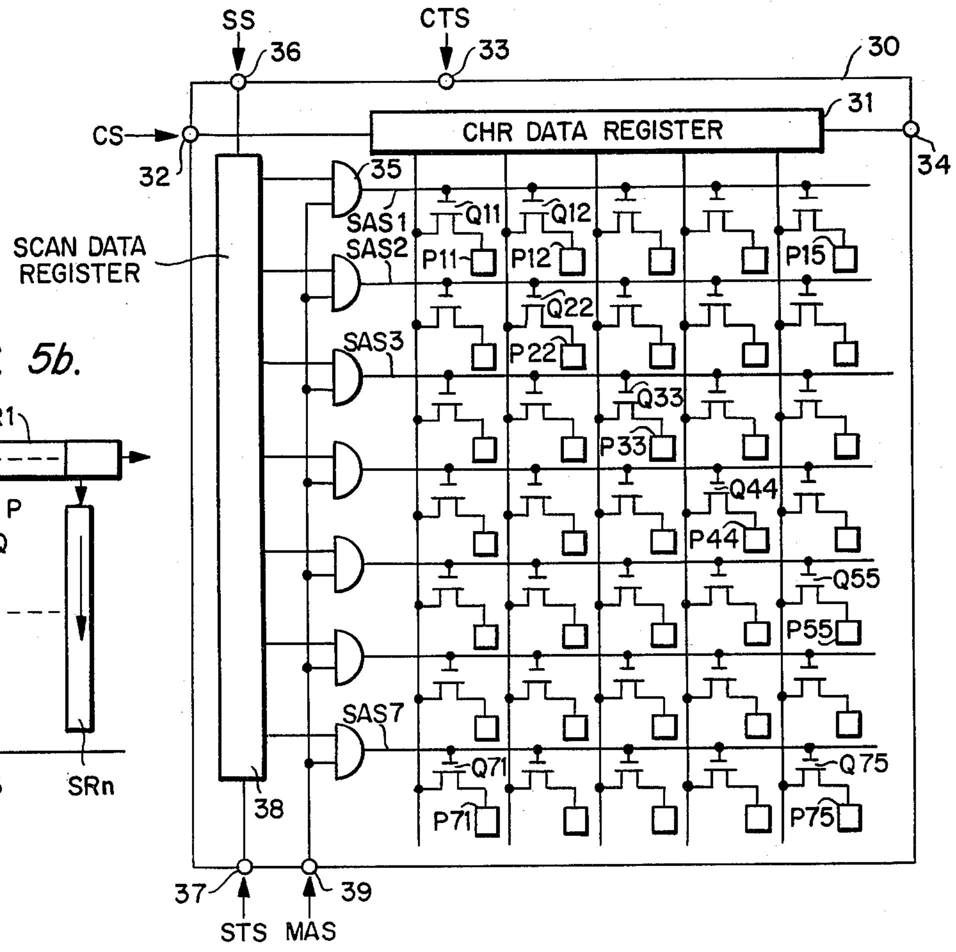
FIG. 7 is the schematic view of another integrated circuit structure of an IC chip which is used as the basic element of the display module.

FIG. 7 shows basically the module circuit structure where the elements for providing the module selection function are added to the IC chip comprising the row and column shift registers as shown in FIG. 5 (*a*).

In FIG. 7, $P_{11}$, $P_{12}$,–, $P_{75}$ are the picture element electrodes which are mutually insulated and formed on the silicon substrate 30 of the specified size in such a manner corresponding to the 5×7 dot matrix picture element arrangement and these are connected to the drain electrodes of the field effect transistors (FET) $Q_{11}$, $Q_{12}$,–, $Q_{75}$ respectively as the active elements for selective driving. The source electrodes of these FETs for driving are connected to the character data shift register 31 via the common X conductor in each column in the longitudinal direction. This character data shift register 31 has the input terminal 32 for a character data signal CS, the input terminal 33 for the character data signal catch timing signal (CTS) and the output terminal 34. The gate electrodes of the FETs for driving are connected to the outputs of the AND gate circuit 35 via the common Y conductor in each row in the lateral direction. One input of this AND gate circuit 35 is connected with the scan shift register 38 providing the input terminal 36 for the scan signal SS and the input terminal 37 for the scan signal catch timing signal STS, while the other input is lead out to the input terminal 39 for the module selection signal MAS.

Figure 8:
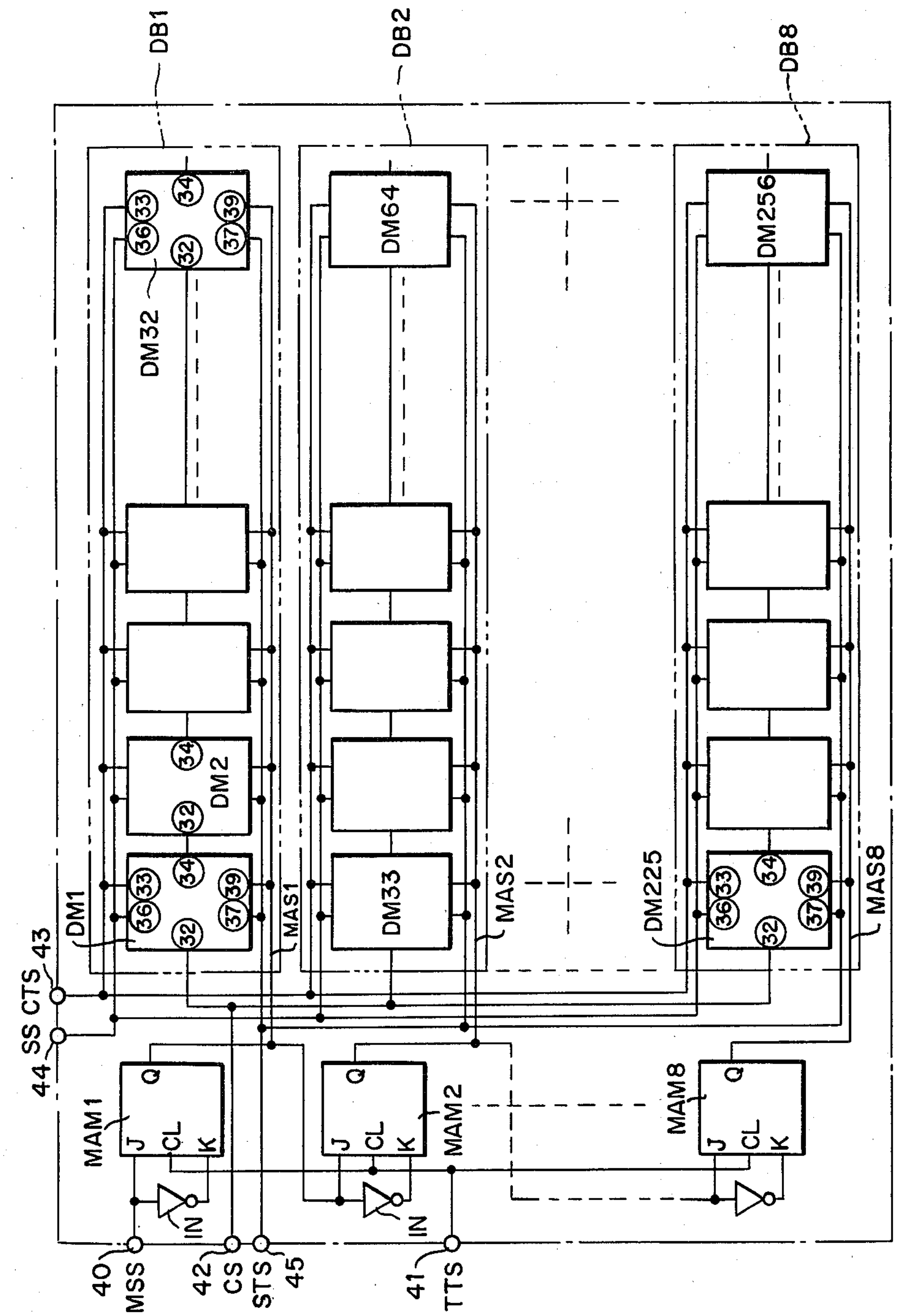
FIG. 8 is a block diagram of a modular display device combining a plurality of display modules.

FIG. 8 outlines an embodiment of the structure of the modular display device wherein a plurality of single character modules as explained above are arranged longitudinally and laterally. In this case, a total of 256 display modules $DM_1$ to $DM_{256}$ are arranged in the form of matrix of 32 columns and 8 rows in order to form the display screen of 32 characters×8 rows. The 32 display modules $DM_1$-$DM_{32}$,–, $DM_{225}$-$DM_{256}$ of each row are respectively mounted on the common subunit substrate, thus forming the display blocks $DB_1$ to $DB_8$ in unit of row, and the terminals 33, 36, 37 and 39 of display modules included in each block are respectively connected in common in units of row. In addition, the character data shift register 31 in each display module is connected in series to the input terminal 32 of the adjacent register via the output terminal 34.

Each of the display blocks DB1 to DB8 in units of row is provided respectively with the memory element MAM1 to MAM8 for module selection which is a feature of the present invention. In the case of the embodiment shown in FIG. 8, this memory element has a structure of the so-called J-K flip-flop (FF) circuit, having the input terminal J of the selection signal, the input terminal CL of the timing signal which instructs the catch of the relevant selection signal, the input terminal K of the inverted signal and the output terminal Q of the selection signal. The terminal J of the memory element MAM 1 incorporated into the display block DM 1 of the 1st row is connected with the terminal 40 for inputting the module selection instruction signal MSS, while the MSS terminal 40 is also connected to the terminal K via the inverter IN. Moreover, the output terminals Q of the memory elements are connected in common to the module selection signal input terminal 39 of the display modules corresponding to the row block and simultaneously is cascade-connected to the J input terminal of the memory element MAM 2 in the next row. Therefore, eight memory elements MAM 1 to MAM 8 as a whole have the structure of eight stages of a shift register and the module selection instruction signal MSS to be input to the J terminal of the 1st memory element MAM 1 from the MSS terminal 40 can be transferred sequentially by the timing signal TTS for catching a signal which is applied in common to the CL terminal of each element from the terminal 41.

In the device of FIG. 8, the input terminals 32 of the character data for the display module of the 1st column of each row are connected in parallel to the input terminal 42 of the character data signal CS, and moreover the terminals 33, 36 and 37 of the display modules are connected in common on the subunit substrate in units of row are also connected in common as a whole and then lead out to the terminal 43 of the character data catch timing signal CTS, terminal 44 of the scan signal SS and the terminal 45 of the scan signal catch timing signal STS. Thus, the display device shown in FIG. 8 has, as a whole, total of six signal input terminals.

Figure 9:
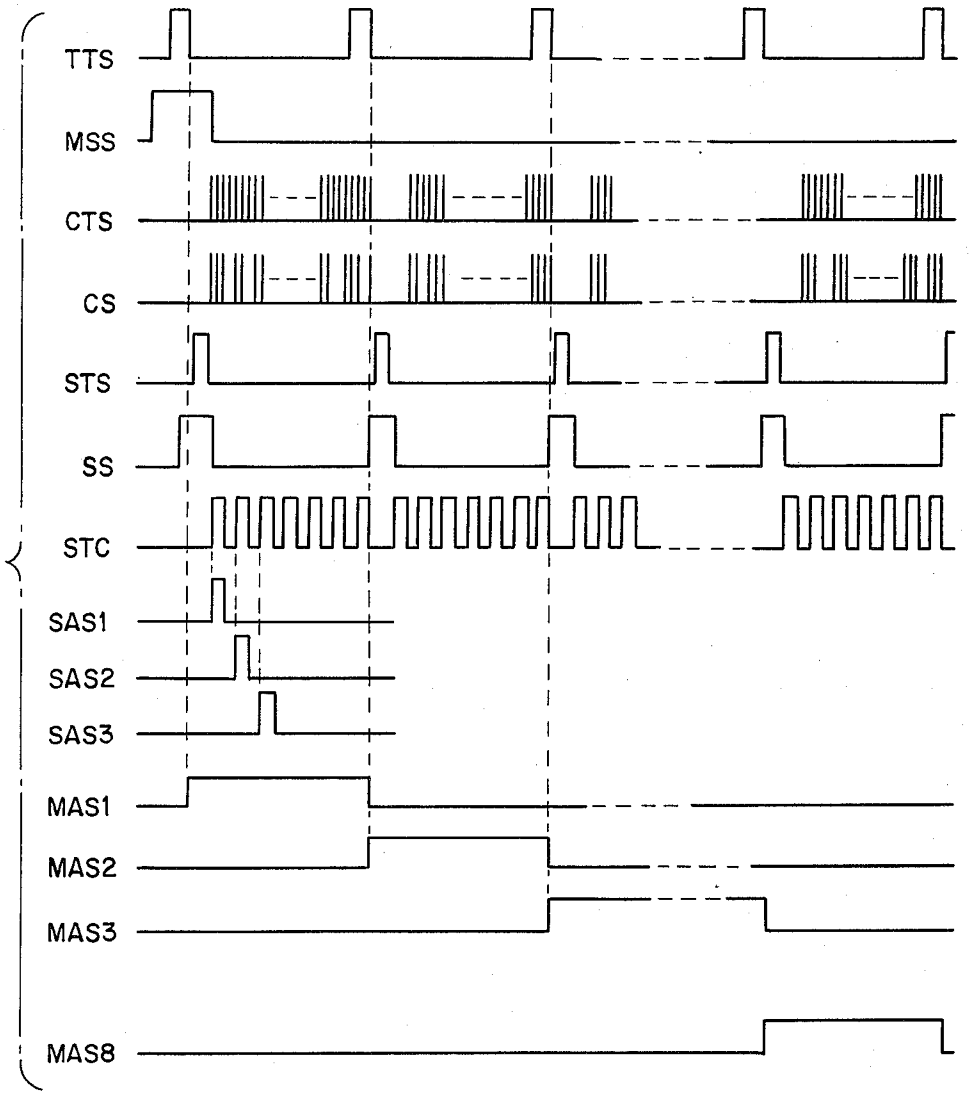
FIG. 9 and FIG. 10 are timing charts for explaining the operations of the modular display device shown in FIG. 8.

The operations of such modular display device is explained hereunder. FIG. 9 shows the timing chart for explaining the operation example by the line sequential access method. The signal waveforms are indicated with the labels corresponding to the signal labels given to the signal input terminals of the device shown in FIG. 8.

When the module selection instruction signal MSS is input from the external interface circuit, this signal is then applied to the J terminal of the memory element MAM 1 having the FF circuit structure incorporated into the display block DB 1 of the 1st row from the terminal 40 and kept in the storing condition at the falling edge of the timing signal TTS. Thus, the memory element MAM 1 outputs the module selection signal MAS 1 of logic "1" from the terminal Q. This selection signal MAS 1 is applied in common to the module selection signal input terminal 39 of the 32 display modules included in the display block of the 1st row, thus opening the AND gate 35 allowing the scan signal to pass and enabling the supply of the scan signal to the driving elements.

The character data signal CS is input to the terminal 42 from the external interface circuit and then applied to the input terminal 32 of the character data shift register 31 included in the display module of the 1st row. At this time, the character data signal CS is sequentially caught by the shift registers which are cascade-connected for each row by the data catch timing signal CTS which is transmitted to the terminal 33 from the terminal 43. Thus, the character data signal train stored first corresponds to the information to be displayed on the heading display line of the display block of the 1st row.

On the other hand, the scan signal SS sent from the terminal 44 is applied to the input terminal 36 of the scan shift register 38 and this signal is caught by the falling edge of the catch timing signal STS sent from the terminal 44. Thereafter, this scan signal is sequentially transferred by the scan timing signal STC (the signal line is not illustrated) and sequentially scans the Y conductor of the other seven (7) lines in synchronization with the address operation by the character data signal. In other words, the scan address signal SAS 1 is applied through the AND gate circuit 35 so that the gate electrodes of FETs for driving the 1st line of the display modules $DM_1$ to $DM_{32}$ of the 1st row are changed to the ON state by the heading pulse of the scan timing signal STC, and simultaneously the FETs, selected in accordance with the data address signal applied from the character data shift register 31, selectively drive the picture element electrodes of the heading line. In order to selectively drive the 2nd display line of the display block DB 1 of the 1st row, the new character data signal CS is controlled by the catch timing signal CTS and input to the character data shift register 31 in series. Meanwhile, the scan address signal SAS in the scan shift register is shifted by one bit by the scan timing signal STC, outputting the signal SAS 2 and the picture element electrodes of the 2nd line are selectively driven by these address signals. Thereafter, in the same way, the picture element electrodes of the seven lines of the 1st row are sequentially driven and the character information of the 1st row is displayed.

As explained above, while the display block DB 1 of the 1st row is driven by the module selection signal MAS 1, the character data character CS, scan signal SS and signal catch timing signal CTS, the scan catch timing signal STS is applied in common to the display blocks of the 2nd and succeeding rows. However, in the display blocks of these 2nd and succeeding rows, an output of the corresponding memory elements for module selection is logic "0", and thereby the AND gate circuit 35 inserted on the output side of the scan shift register of the display modules is closed. For this reason, the scan address signal is not allowed to pass through the gate electrodes of FETs for driving, disabling the actual driving operation.

When the driving operation for the 1st row completes, the signal catch timing signal TTS for catching the module selection signal is generated so that the module selection signal MAS 1 for the 1st row is caught by the memory element MAM 2 corresponding to the display blocks of the 2nd row. Thus the MAM 2 generates the module selection signal MAS 2 of the 2nd row from its terminal Q. This module selection signal MAS 2 enables the driving of the display blocks of the 2nd row. Thus, these blocks are sequentially addressed from the heading line as in the case of the 1st row. As explained above, the module selection signals which are sequentially transferred between the memory elements corresponding to the rows and the display blocks in units of row, are selectively driven in time series. Thereby the display of a single display screen is completed.

Figure 10:
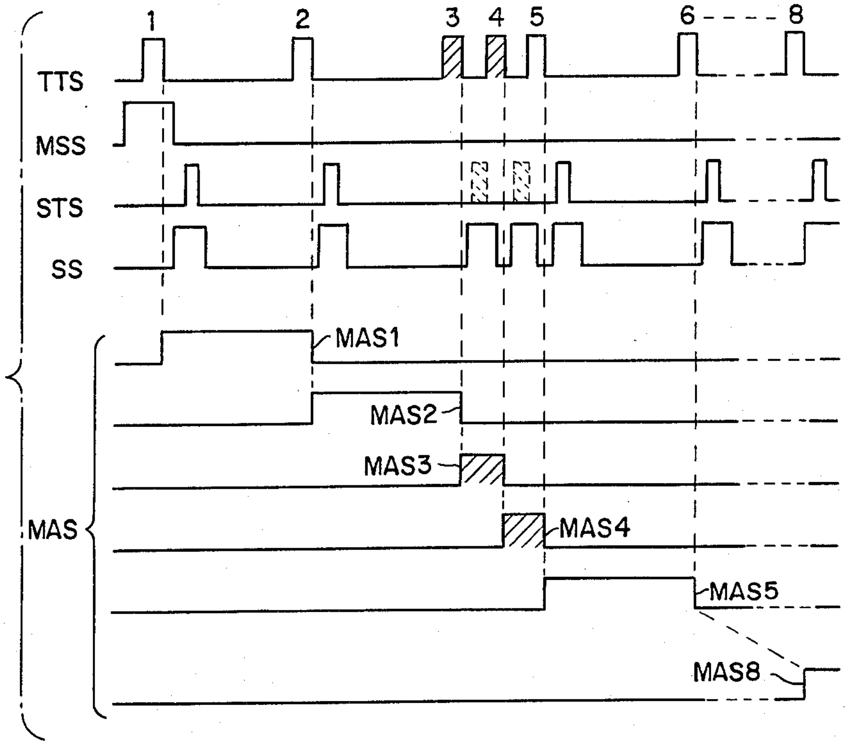

Meanwhile, in case there are spaces in displays in the line sequential access method as mentioned above, speed-up of display can be realized by skipping the address operation at the relevant space line. FIG. 10 shows the timing chart for explaining such skip access operation, wherein the signal waveforms for skipping the scan address of the 3rd and 4th rows are indicated particularly.

Namely, in FIG. 10, after the display blocks of the 1st and 2nd rows are sequentially driven by the module selection signals MAS 1 and MAS 2, the control is carried out in such a way that the succeeding scan signal catch timing signals STSs are suppressed by the signal catch timing signal TTS (the 3rd pulse) for shifting the signal MAS 2 in the preceding stage to the 3rd memory element MAM 3. Thereafter, after the signal catch timing signal TTS (the 4th pulse) is applied in order to transfer the module selection signal MAS 3 to the memory element MAM 4 of the next row, the control is carried out in such a way that the next scan signal catch timing signal STS is suppressed by the relevant signal catch timing signal. When the time interval of the signal catch timing signal TTS for storing the module selection instruction signals MSS into the memory element is curtailed and simultaneously the scan signal catch timing signal STS during such period is suppressed, the skip operation can be realized because the module selection signals MAS 3 and MAS 4 are generated but an output of the scan shift register does not become effective.

In the above explanation, the sequential access and skip access in units of row are realized by providing the memory elements of module selection signals corresponding to rows and executing the logic operations with the module selection instruction signal MSS sent from the memory elements and an output signal from the scan shift registers, however, a variety of access systems can be employed by adequately setting the inter-relation between the display modules and display blocks and adding the memory elements for required blocks.

Figure 11:
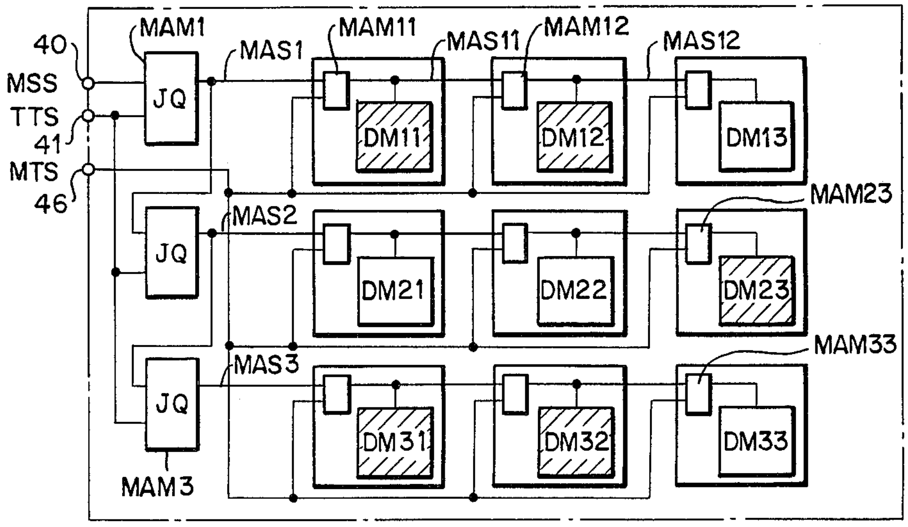
FIG. 11 is a block diagram of an alternate embodiment of the modular display device.

FIG. 11 shows an embodiment of a display device using the character sequential access method. In this figure, nine display modules DM11 to DM33 are arranged in the form of matrix of 3-rows×3-columns for simplification. The display modules have the structure that the module selection memory elements MAM11 to MAM33 having the FF circuit structure are integrated on the IC chip for driving and these are connected in series for each row on the subunit which is not illustrated. In addition, as in the case of above embodiment shown in FIG. 8, the FF memory elements MAM1 to MAM3 for row block selection are provided corresponding to each row, and the Q terminal outputs of these memory elements are connected to the 1st J input terminals of the memory elements corresponding to modules connected in series for each row. On the other hand, they are also connected to the J terminals of the row selection memory elements incorporated into the next row, thus enabling signal transfer. In addition, the catch and transfer of signals for the row selection memory elements MAM1 to MAM3 are controlled by the signal catch timing signal TTS sent from the terminal 41 and the catch and transfer of signals for the module selection memory elements MAM11 to MAM33 are controlled by the module catch and transfer timing signal MTS sent from the terminal 46. The signal lines for data and scan sides are not illustrated for simplification, but they are the same as those of an embodiment shown in FIG. 8. Therefore, as the display device of FIG. 11, only one input terminal 46 of the module catch and transfer timing signal MTS is added.

Figure 12:
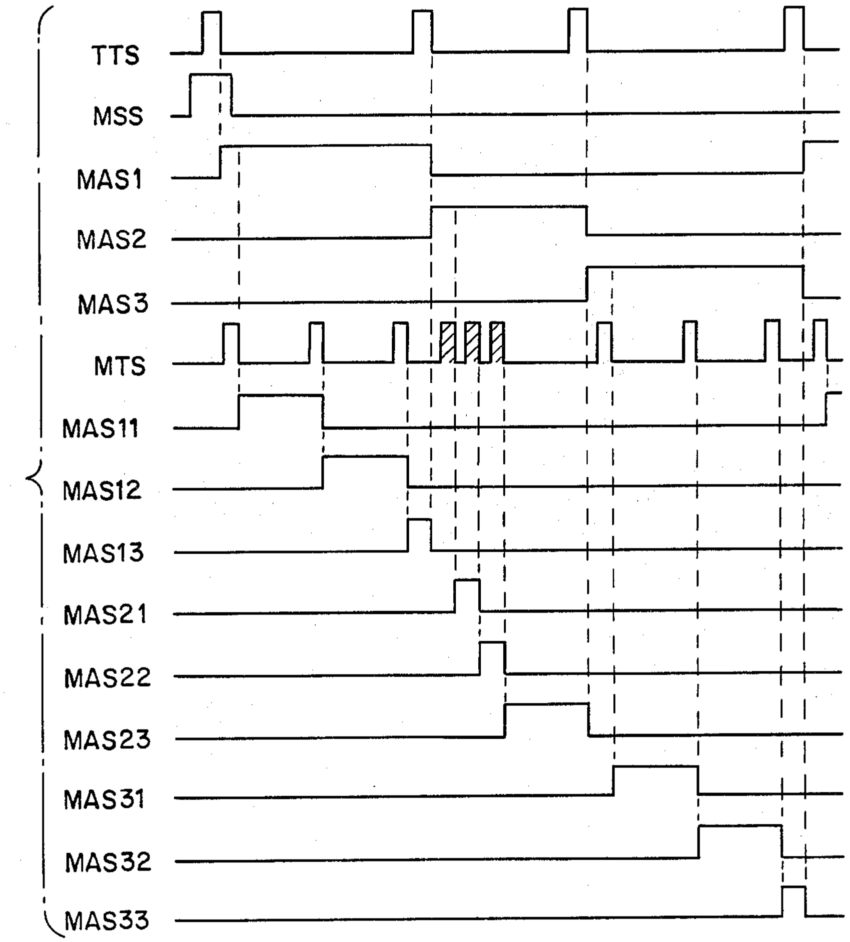
FIG. 12 is a timing chart for explaining the operations of the modular display device shown in FIG. 11.

According to the structure of FIG. 11, the sequential access and high speed skip access for each character (module) are possible and the optimum operation mode can be set in accordance with display contents. FIG. 12 shows the timing chart for explaining such operations. In this case, the display modules DM11, 12, 23, 31 and 32 indicated as the hatched portions of FIG. 11 are selectively driven and the remaining modules are skipped.

Namely, after the module DM12 is selectively driven by the module selection signal MAS12, the module catch and transfer timing signal MTS for sending the relevant selection signal to the next module DM13 is thinned out and the row selection signal MAS1 is advanced to the next row by the signal catch timing signal TTS, and moreover the selection signal MAS 2 of the 2nd row is transferred up to the memory element MAM23 of the module DM23 by the module catch and transfer timing signal MTS which is controlled at a high speed, thus selectively driving the relevant module. In this case, although not indicated in the figure, the character data is input character by character in common for all modules in accordance with the scanning sequence and only the modules for which the logic gates in the scan address or data address side are opened by the the module selection signal are driven effectively.

The principal embodiments of the present invention are explained above, but a variety of modifications and expansions are possible for those skilled in this field. For example, the display module structure may include the picture elements in a unit of one character or the picture elements of plural characters. In addition, as for the selection of display modules, it is naturally possible to select the blocks in units of row and moreover it is also possible to employ the other block formats determined freely, and of course it is possible to select module by module. Furthermore the circuit structure integrated on the semiconductor substrate of each module is capable of incorporating the memory driving system where the capacitor for accumulating the signal is connected to the active elements for driving, in addition to the refresh system as indicated above and moreover it is possible to introduce a variety of modifications.

As is understood from the foregoing explanation, according to the present invention, a solid state flat panel display having a large display screen can be configured very easily.

In addition, a display device as a whole can be configured very economically because wiring and interface of control can be made very easily, and excellent functions such as sequential access and high speed skip access etc. assure the setting of the optimum operation mode in accordance with display contents. Thus, the present invention is very effective for adopting the display device comprising the driving circuits into the character display device for computer terminals.

What is claimed is:

1. A display device having a structure combining a plurality of display modules comprising a plurality of display picture elements and semiconductor active elements each operatively connected to one of said display picture elements, wherein said plurality of display modules each further comprise: a circuit substrate, attached to said semiconductor active elements, for driving the semiconductor active elements corresponding to said display picture elements and address circuits, operatively connected to said semiconductor active elements and attached to said circuit substrate, for inputting a display signal and distributing it to said semiconductor active elements.

2. A display device as claimed in claim 1, wherein said circuit substrate comprises picture element electrodes operatively connected to said semiconductor active elements in such number as correspond to the number of dots in a unit of one block that are required for a character display having a dot matrix format.

3. A display device as claimed in claim 1, wherein said address circuit includes a plurality of shift registers operatively connected to said semiconductor active elements.

4. A display device as claimed in claim 1 or 2, wherein said plurality of display modules are mounted in common on a mounting substrate.

5. A display device as claimed in claim 4, wherein said common mounting substrate includes conductors for connecting said plurality of display modules.

6. A display device as claimed in claim 5, wherein said address circuits on said circuit substrate, operatively connected to said plurality of display modules, comprise shift registers each having a stage and an input and output for each stage, and wherein said semiconductor active elements corresponding to said picture element electrodes are operatively connected to the output of respective stages of said shift registers, and the input/output terminals of respective shift registers are operatively connected in series for said plurality of display modules.

7. A display device as claimed in claim 1, wherein said display device comprises:

- a mounting substrate;
- a common display medium;
- a plurality of said circuit substrates further including
  - a common sub-unit substrate; and
  - a plurality of display picture element electrodes arranged on the common sub-unit substrate;
- a subunit integrating a plurality of display modules by stacking the common display medium on said plurality of circuit substrates; and
- a plurality of said subunits mounted on the mounting substrate.

8. A display device, operatively connectable to receive a module selection signal and an address signal, comprising:

- a plurality of display modules each of which comprise
  - a display medium;
  - a plurality of picture element electrodes arranged facing said display medium; and
  - active elements, each operatively connected to one of said picture elements, for selective driving corresponding to said picture element electrodes;
- wherein each display module further comprises:
  - a first input terminal for receiving the module selection signal;
  - a second input terminal for receiving the address signal; and
  - an address circuit, operatively connected to said second input terminal and to said active elements, distributing said address signal to said active elements,
- wherein said display device further includes a memory element, operatively connected to said first input terminal, for receiving said module selection signal for each display block which comprises at least a unit of one display module, and wherein sequential control of a storing condition of said memory elements selectively enables driving of display modules for the corresponding display block.

9. A display device as claimed in claim 8, wherein each of said plurality of display modules further comprises a semiconductor substrate integrating said active elements for selective driving and said memory elements for storing said module selection signal.

10. A display device as claimed in claim 8, wherein said memory elements each have input/output terminals and said input/output terminals of said memory elements are operatively connected so that said memory elements are connected in series and the module selection signal can be transferred sequentially between respective ones of said memory elements.

11. A display device as claimed in claim 8, further comprising logic gate circuits which open or close in response to the module selection signal sent from said memory elements and are operatively connected between the output of said address circuit included in each of said plurality of display modules and said active elements for selective driving, whereby said logic gate circuits enable selective driving of said plurality of display modules.

12. A display device as claimed in claim 8, wherein a display block in a unit of a row is configured by arranging a plurality of said display modules laterally, wherein a display screen for multi-row display is configured by arranging in parallel said display blocks in a plurality of rows longitudinally, and wherein said display modules of each row are selected in common by arranging said memory elements for module selection corresponding to the display blocks in units of row.

13. A display device as claimed in claim 8, wherein display blocks in units of row are formed by laterally arranging a plurality of said display modules, wherein a multi-row display screen is formed by longitudinally arranging in parallel said display blocks in a plurality of rows, wherein said memory elements include memory elements for module selection which correspond to said display modules and which are operatively connected in series for each row, wherein said memory elements include memory elements for row selection which correspond to said display blocks arranged in units of row and are operatively connected in series, wherein outputs of said memory elements for row selection are connected to the inputs of the first of said memory elements for module selection of the corresponding row, thereby the module selection signals can be transferred sequentially between the memory elements for row selection and between the memory elements for module selection of each row.

14. A display device as claimed in claims 8, 9, 10, 11, 12 or 13, wherein said display device is operatively connectable to receive a timing signal and an inverted module selection signal, wherein said memory elements for module selection which store the module selection signals comprise flip-flop circuits respectively including:

a third input terminal for receiving the timing signal for initiating storage of the module selection signal in said memory elements, a fourth input terminal for receiving the inverted module selection signal and a signal output terminal.

15. A display device, operatively connectable to receive a module selection instruction signal and a signal catch timing signal, comprising:

N inverters, where N is an integer greater than or equal to two, the first inverter operatively connectable to receive the module selection instruction signal;

N memory elements, each operatively connectable to receive the signal catch timing signal, the first memory element operatively connectable to receive the module selection signal and operatively connected to the first inverter, the Kth memory element operatively connected to an output of the K-1th memory element and to the output of the Kth inverter, the Kth inverter being operatively connected to the output of the K-1th memory element, where K is greater than or equal to two and less than or equal to N; and N display blocks, the first display block operatively connected to the output of the first memory element and the Kth display block operatively connected to the output of the Kth memory element.

16. A display device as claimed in claim 15, wherein said N memory elements each comprise a flip-flop, wherein the first flip-flop is operatively connectable to receive the module selection instruction signal and to receive the signal catch timing signal, and operatively connected to the first inverter and to the first display block, and wherein the Kth flip-flop is operatively connected to the Kth inverter, to the Kth display block and to the K-1th flip-flop.

17. A display device as claimed in claim 15, wherein said display device is operatively connectable to receive a character signal, wherein each of said N memory elements passes therethrough the module selection signal, wherein each of said N display blocks comprises M display modules, where M is an integer greater than or equal to two, each having a character input and a character output, the first display module character input the first display module operatively connectable to receive the character signal and operatively connected to the out-put of one of said N memory elements to receive the module selection signal, and the Lth display module character input operatively connected to the L-1th character output and the Lth display module operatively connected to receive the module selection signal, where L is an integer greater than or equal to 2 and less than or equal to M.

18. A display device as claimed in claim 17, wherein said display device is operatively connectable to receive a module catch and transfer timing signal, wherein each of said N display blocks further comprises M module selection memory elements, the first module selection memory element operatively connected to the output of the one of said N memory elements to receive the module selection signal and to the first display module and operatively connectable to receive the module catch and transfer timing signal, the Lth module selection memory element operatively connected to an output of the L-1th module selection memory element and to the Lth display module.

19. The display device as claimed in claim 17 or 18, wherein each of said M display modules comprises a row element including:

a row element shift register operatively connectable to receive the character signal and having outputs;

active driving elements each operatively connected to one of the outputs of said row element shift register; and picture elements each operatively connected to one of said active driving elements.

20. A display device as claimed in claim 19, wherein said row element shift register has an output, wherein each of said M display modules further comprises P of said row elements arranged in parallel where P is an integer greater than or equal to two, the first row element operatively connectable to receive the character signal and the Ith row element operatively connected to the output of the I-1th row element, so that a rectangular display module is formed, where I is an integer greater than or equal to 2 and less than or equal of P.

21. A display device as claimed in claim 17 or 18, wherein each of said M display modules comprises:

a first shift register operatively connectable to receive the character signal and having outputs;

second shift registers, each operatively connected to one of the outputs of said first shift register and each having outputs;

active driving elements, each operatively connected to one of the outputs of said second shift registers; and picture elements operatively connected to said active driving elements.

22. A display device as recited in claim 21, wherein said second shift registers are aligned in parallel so that a rectangular display module is formed.

23. A display device as claimed in claim 17 or 18, wherein said display device is operatively connectable to receive a scan catch timing signal, wherein each of said M display modules comprise:

a first shift register operatively connectable to receive the character signal and having R outputs where R is an integer;

a second shift register operatively connectable to receive the scan catch timing signal having S outputs, where S is an integer;

S AND gates each operatively connectable to receive the module selection signal and operatively connected to the respective outputs of said second shift register;

RxS active driving elements each of said RxS active driving elements operatively connected to the respective one of said first shift register outputs and to the output of the respective one of said S AND gates; and RxS picture elements operatively connected to the respective one of said RxS active driving elements.

24. A display device as claimed in claim 23, wherein said RxS picture elements are arranged in a rectangle so that a rectangular display module is formed.

25. A display device as claimed in claim 20, wherein each of said M display modules further comprises:

an insulating substrate;

an integrated circuit mounted on said insulating substrate;

a display medium abutting said integrated circuit;

a transparent electrode abutting said display medium; and a cover abutting said transparent electrode.

26. A display device as claimed in claims 21, wherein each of said M display modules further comprises:

an insulating substrate;

an integrated circuit mounted on said insulating substrate;

a display medium abutting said integrated circuit;

a transparent electrode abutting said display medium; and a cover abutting said transparent electrode.

27. A display device as claimed in claims 23, wherein each of said M display modules further comprises:

an insulating substrate;

an integrated circuit mounted on said insulating substrate;

a display medium abutting said integrated circuit;

a transparent electrode abutting said display medium; and a cover abutting said transparent electrode.

28. A display device as claimed in claim 25, wherein said integrated circuit has formed thereon said picture elements each including a picture element electrode, said active driving elements, said shift registers and said AND gates.

29. A display device as claimed in claim 26, wherein said integrated circuit has formed thereon said picture elements each including a picture element electrode, said active driving elements, said shift registers and said AND gates.

30. A display device as claimed in claim 27, wherein said integrated circuit has formed thereon said picture elements each including a picture element electrode, said active driving elements, said shift registers and said AND gates.

31. A display device as claimed in claim 28, wherein said display device further comprises a mounting substrate and wherein said M display modules are mounted on said mounting substrate forming a rectangular display device is formed.

32. A display device as claimed in claim 29, wherein said display device further comprises a mounting substrate and wherein said M display modules are mounted on said mounting substrate forming a rectangular display device is formed.

33. A display device as claimed in claim 30, wherein said display device further comprises a mounting substrate and wherein said M display modules are mounted on said mounting substrate forming a rectangular display device is formed.

* * * * *

UNITED STATES PATENT AND TRADEMARK OFFICE

CERTIFICATE OF CORRECTION

PATENT NO. : 4,368,467

DATED : January 11, 1983

INVENTOR(S) : TOMOYUKI UNOTORO ET AL.

It is certified that error appears in the above-identified patent and that said Letters Patent is hereby corrected as shown below:

Title page [56] OTHER PUBLICATIONS, line 1, "Ludo" should be --Luo--;

Title page [56] OTHER PUBLICATIONS, line 3, after "Panels"," insert --IEEE TRANSACTIONS,--.

Column 1, line 10, delete "a" (second occurrence).

Column 2, line 15, after "ally" insert --,--;
line 15, after "timing" insert --,--;

Column 3, line 15, "like" should be --e.g.,--;
line 25, "it" (first occurrence) should be --is--;
line 44, after "example" insert --of--.

Column 4, line 40, after "limited," insert --the--;
line 41, delete "the";
line 50, "of of" should be --of a--.

Column 5, line 53, delete "thereby";
line 68, delete "is".

UNITED STATES PATENT AND TRADEMARK OFFICE
CERTIFICATE OF CORRECTION

PATENT NO. : 4,368,467 Page 2 of 2
DATED : January 11, 1983
INVENTOR(S) : TOMOYUKI UNOTORO ET AL.

It is certified that error appears in the above-identified patent and that said Letters Patent is hereby corrected as shown below:

Column 7, line 14, "unit" should be --units--.
Column 8, line 60, "character" (second occurrence) should be --signal--;
line 61, "signal" (first occurrence) should be --character--.
Column 10, line 51, delete "the" (first occurrence).
Column 11, line 64, "subunit" should be --sub-unit--;
line 67, "subunits" should be --sub-units--.

Signed and Sealed this

*Eighteenth* Day of *October 1983*

[SEAL]

*Attest:*

GERALD J. MOSSINGHOFF

*Attesting Officer* *Commissioner of Patents and Trademarks*